United States Patent
Chen et al.

(10) Patent No.: US 8,063,601 B2
(45) Date of Patent: Nov. 22, 2011

(54) MOTOR DRIVING CIRCUIT FOR ADJUSTING SPEED OF A MOTOR BY CHANGING AN OUTPUT VOLTAGE

(75) Inventors: Ke-Min Chen, Taichung (TW); Ching-Sheng Li, Hsinchu County (TW); Kun-Min Chen, Changhua County (TW); Shen-Min Lo, Hsinchu (TW); Ching-Shan Lu, Kaohsiung County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 531 days.

(21) Appl. No.: 12/254,800

(22) Filed: Oct. 20, 2008

(65) Prior Publication Data
US 2010/0052591 A1 Mar. 4, 2010

(30) Foreign Application Priority Data
Sep. 2, 2008 (TW) .............................. 97133572 A

(51) Int. Cl.
*H02P 1/28* (2006.01)
(52) U.S. Cl. .......... 318/504; 318/494; 361/90; 388/825; 388/830; 388/833
(58) Field of Classification Search ............ 318/494, 318/504; 361/90; 388/825, 830, 833
See application file for complete search history.

(56) References Cited

U.S. PATENT DOCUMENTS

| | | | | |
|---|---|---|---|---|
| 4,955,431 | A | * | 9/1990 | Saur et al. .................. 165/271 |
| 6,055,359 | A | * | 4/2000 | Gillett .......................... 388/819 |
| 2004/0174131 | A1 | * | 9/2004 | Sivertsen .................... 318/639 |
| 2004/0217730 | A1 | * | 11/2004 | Horng et al. ................ 318/825 |
| 2005/0040778 | A1 | * | 2/2005 | Lin et al. ..................... 318/268 |
| 2005/0047762 | A1 | * | 3/2005 | Liu et al. ..................... 388/806 |
| 2006/0127066 | A1 | * | 6/2006 | Chiu et al. ................... 388/804 |
| 2008/0002953 | A1 | * | 1/2008 | Vogt et al. ................... 388/833 |

FOREIGN PATENT DOCUMENTS
CN 2559166 Y 7/2003
* cited by examiner

*Primary Examiner* — Walter Benson
*Assistant Examiner* — Kawing Chan
(74) *Attorney, Agent, or Firm* — Winston Hsu; Scott Margo

(57) ABSTRACT

A motor driving circuit for adjusting speed of the motor by changing output voltage is disclosed. One end of the motor is coupled to a variable voltage source. The motor driving circuit includes a motor-driving unit, a control unit and a determining unit. The motor-driving unit includes a first end coupled to another end of the motor, a second end coupled to a ground and a third end, and is utilized for driving the motor. The control unit is utilized for controlling the voltage between the first end and the third end of the motor-driving unit. The determining unit is coupled between the variable voltage source and the control unit, and is utilized for controlling the control unit to adjust the voltage between the first end and the third end of the motor-driving unit according to magnitude of the voltage of the variable voltage source.

9 Claims, 4 Drawing Sheets

_US 8,063,601 B2_

MOTOR DRIVING CIRCUIT FOR ADJUSTING SPEED OF A MOTOR BY CHANGING AN OUTPUT VOLTAGE

BACKGROUND OF THE INVENTION

1. Field of the Invention

The present invention relates to a motor driving circuit, and more particularly, to a motor driving circuit for driving a motor while reducing power consumption.

2. Description of the Prior Art

With the progress of computer technology, 3C products are increasingly becoming human-based and multi-functional. However, with enhanced computing ability also comes higher and higher heat generated by a computing chip. Thus, means of dissipating heat are garnering attention in the market. Present methods for dissipating heat generally use a heat-dissipating fan. However, the heat-dissipating fan generates a considerable amount of noise.

Please refer to FIG. 1, which is a schematic diagram of a prior art driving circuit 10 for driving a fan motor 12. As shown in FIG. 1, the driving circuit 10 is coupled between an input voltage source VIN and the fan motor 12, and comprises a control unit 100, a resistor 102 and a power switching device 104. The resistor 102 and the power switching device 104 are coupled in parallel, and a voltage across both is VIN1. The control unit 100 is coupled to a base of the power switching device 104, and is utilized for choosing a conducting route either through the resistor 102 or through the power switching device 104, so as to adjust the voltage VIN1. When the voltage VIN1 is adjusted, a voltage VIN2 across the fan motor 12 is correspondingly adjusted, thereby adjusting the speed of the fan motor 12. In other words, when the control unit 100 conducts the power switching device 104, the voltage VIN1 is reduced, causing the voltage VIN2 across the fan motor 12 to become higher and the speed of the fan motor 12 to become faster in order to dissipate more heat. When the control unit 100 turns off the power switching device 104, the conducting route will be through the resistor 102. In such a condition, the voltage VIN1 is higher, causing the voltage VIN2 across the fan motor 12 to become lower and the speed of the fan motor 12 to become slower in order to reduce noise generated by the fan.

Though the driving circuit 10 can reduce noise generated by the fan, there are still some disadvantages. For example, the driving circuit 10 utilizes the resistor 102 to lower the voltage VIN2, but the amount by which the voltage VIN2 is lowered will vary with a load current. When the voltage VIN2 is low, the load current is smaller, and therefore the amount by which the voltage VIN2 is lowered is below an expected value. Thus, when the voltage VIN2 is low, the ability to adjust the speed of the fan motor 12 is limited by the load current. Though the load current is greater when the voltage VIN2 is high, the speed of the fan motor 12 cannot be reduced linearly. Besides, whether or not the current flows through the resistor 102 or the power switching device 104, a lot of power is consumed, which lowers power efficiency, and makes realization of the driving circuit 10 with integrated circuits become difficult.

SUMMARY OF THE INVENTION

It is therefore a primary objective of the claimed invention to provide a motor driving circuit for adjusting speed of a motor by changing an output voltage to overcome the drawbacks of the prior art.

The present invention discloses a motor driving circuit for adjusting speed of a motor by changing an output voltage. One end of the motor is coupled to a variable voltage source. The motor driving circuit comprises a motor-driving unit, a control unit and a determining unit.

The motor-driving unit is utilized for driving the motor, and comprises a first end coupled to another end of the motor, a second end coupled to ground, and a third end. The control unit is coupled between the first end and the third end of the motor-driving unit for controlling the voltage between the first end and the third end of the motor-driving unit. The determining unit is coupled between the variable voltage source and the control unit for controlling the control unit to adjust the voltage between the first end and the third end of the motor-driving unit according to a magnitude of the voltage of the variable voltage source.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
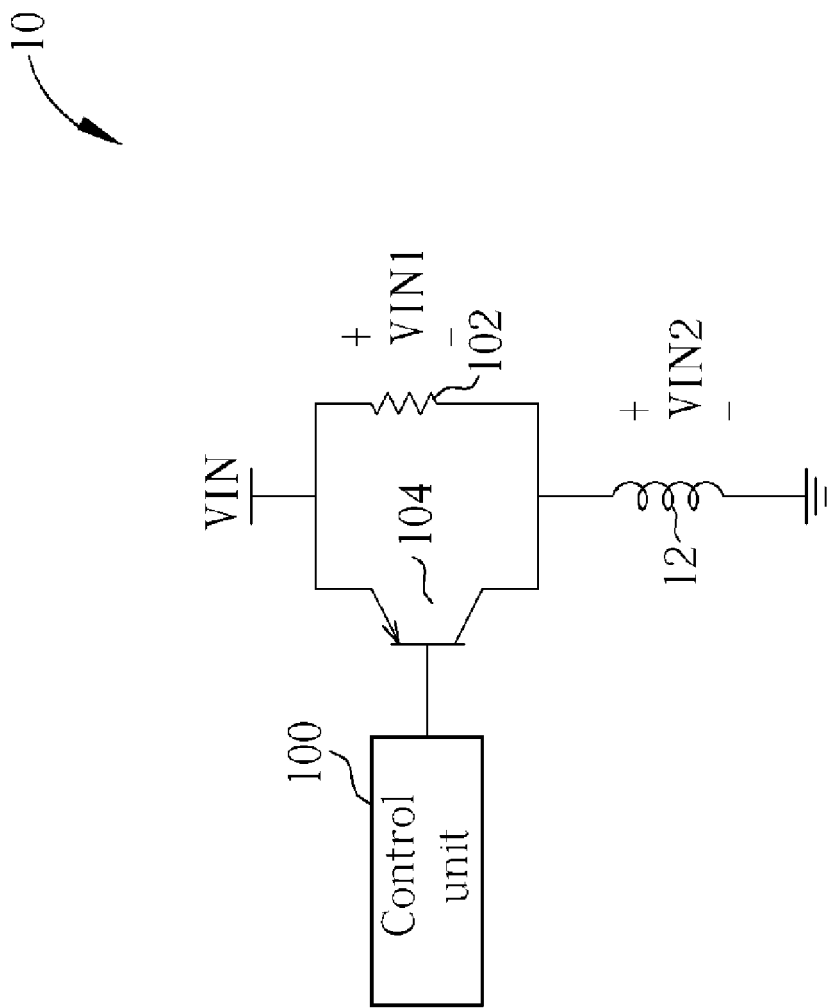
FIG. 1 is a schematic diagram of a prior art driving circuit for driving a fan motor.
Figure 2:
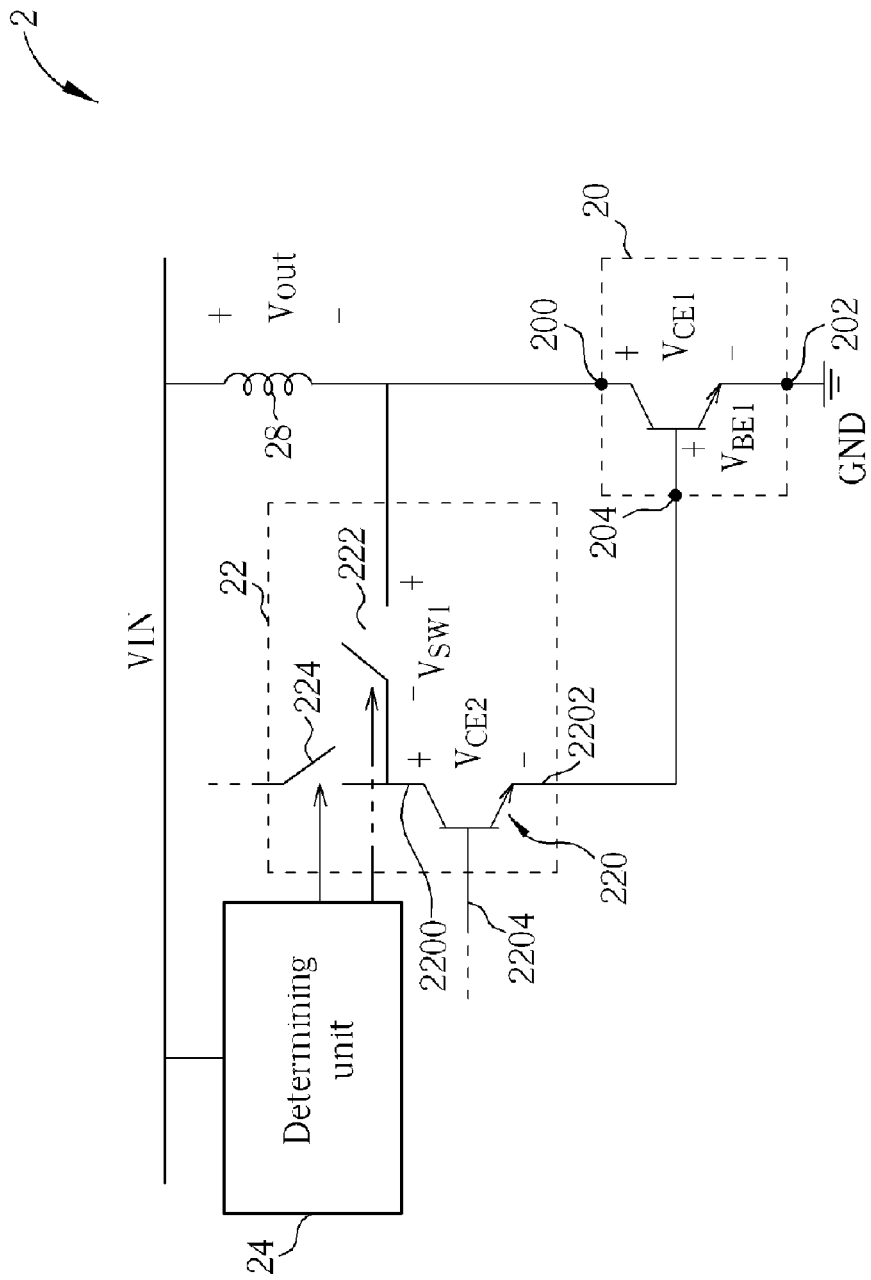
FIG. 2 is a schematic diagram of a motor driving circuit for adjusting speed of a motor by changing an output voltage according to an embodiment of the present invention.

Please refer to FIG. 2, which is a schematic diagram of a motor driving circuit 2 for adjusting speed of a motor 28 by changing an output voltage according to an embodiment of the present invention. The motor 28 is adopted by a heat-dissipating fan or other devices. One end of the motor 28 is coupled to a variable voltage source VIN, and another end of the motor 28 is controlled by the motor driving circuit 2. The motor driving circuit 2 comprises a motor-driving unit 20, a control unit 22 and a determining unit 24.

The motor-driving unit 20 is an N-type bipolar junction transistor. The collector 200 thereof is coupled to the motor 28, the emitter 202 thereof is coupled to a ground GND, and the base 204 thereof is coupled to the control unit 22.

The control unit 22 is coupled between the collector 200 and the base 204 of the motor-driving unit 20, and is utilized for controlling the voltage between the collector 200 and the base 204 of the motor-driving unit 20. The control unit 22 comprises a voltage-dropping device 220, a first switching device 222 and a second switching device 224. The voltage-dropping device 220 is an N-type bipolar junction transistor, and the collector 2200 thereof is coupled between the first switching device 222 and the second switching device 224. The base 2204 thereof is coupled to a voltage which is capable of conducting the voltage-dropping device 220, so as to keep the voltage-dropping device 220 in conduction to provide a dropping voltage $V_{CE2}$. The emitter 2202 of the voltage-dropping device 220 is coupled to the base 204 of the motor-driving unit 20, and is utilized for conducting the motor-driving unit 20, causing the motor-driving unit 20 to provide a dropping voltage $V_{CE1}$. The first switching device 222 is coupled between the collector 200 of the motor-driving unit 20 and the collector 2200 of the voltage-dropping device 220, and the second switching device 224 is coupled to the collector 2200 of the voltage-dropping device 220. Both the first switching device 222 and the second switching device 224 are controlled by the determining unit 24.

The determining unit 24 is coupled between the variable voltage source VIN and the control unit 22, and is utilized for controlling the control unit 22 to adjust the voltage between the collector 200 and the base 204 of the motor-driving unit 20 according to a magnitude of the voltage of the variable voltage source VIN. In detail, when magnitude of the voltage of the variable voltage source VIN is more than a default value, the determining unit 24 will turn on the second switching device 224 and turn off the first switching device 222. In such a condition, voltage between the collector 200 and the base 204 of the motor-driving unit 20 is $V_{CE1}$, and an output voltage $V_{OUT}$ across the motor 28 is (VIN−$V_{CE1}$). When magnitude of the voltage of the variable voltage source VIN is less than the default value, the determining unit 24 will turn on the first switching device 222 and turn off the second switching device 224, resulting in the voltage between the collector 200 and the base 204 of the motor-driving unit 20 becoming ($V_{SW1}$+$V_{CE2}$) while the dropping voltage between the base 204 and the emitter 202 is $V_{BE1}$. Adding the two values, a voltage between the collector 200 and the emitter 202 can be obtained as ($V_{SW1}$+$V_{CE2}$+$V_{BE1}$). In such a condition, the output voltage $V_{OUT}$ across the motor 28 becomes (VIN−($V_{SW1}$+$V_{CE2}$+$V_{BE1}$)). In conclusion, when magnitude of the voltage of the variable voltage source VIN is more than the default value, the output voltage $V_{OUT}$ across the motor 28 is increased to (VIN−$V_{CE1}$), causing the speed of the motor 28 to also increase, whereas when magnitude of the voltage of the variable voltage source VIN is less than the default value, the output voltage $V_{OUT}$ across the motor 28 is reduced to (VIN−($V_{SW1}$+$V_{CE2}$+$V_{BE1}$)), causing the speed of the motor 28 to become slower, so as to reduce noise generated by the motor 28. Therefore, the determining unit 24 can switch the first switching device 222 and the second switching device 224 according to magnitude of the voltage of the variable voltage source VIN, to adjust the voltage between the collector 200 and the base 204 of the motor-driving unit 20. In this way, the speed of the motor 28 can be adjusted to timely reduce noise generated by the motor 28.

Figure 3:
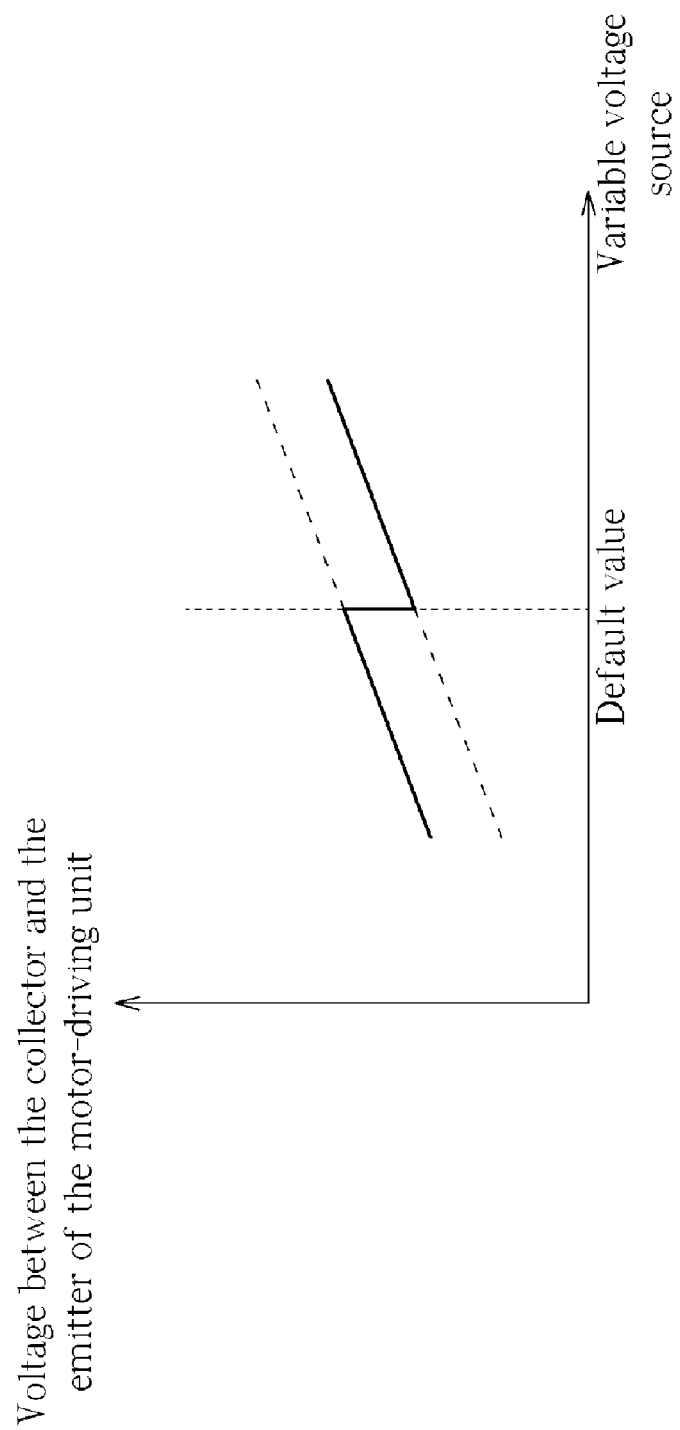
FIG. 3 is a schematic diagram of the voltage between the collector and the emitter of the motor-driving unit relative to the variable voltage source according to an embodiment of the present invention.
Figure 4:
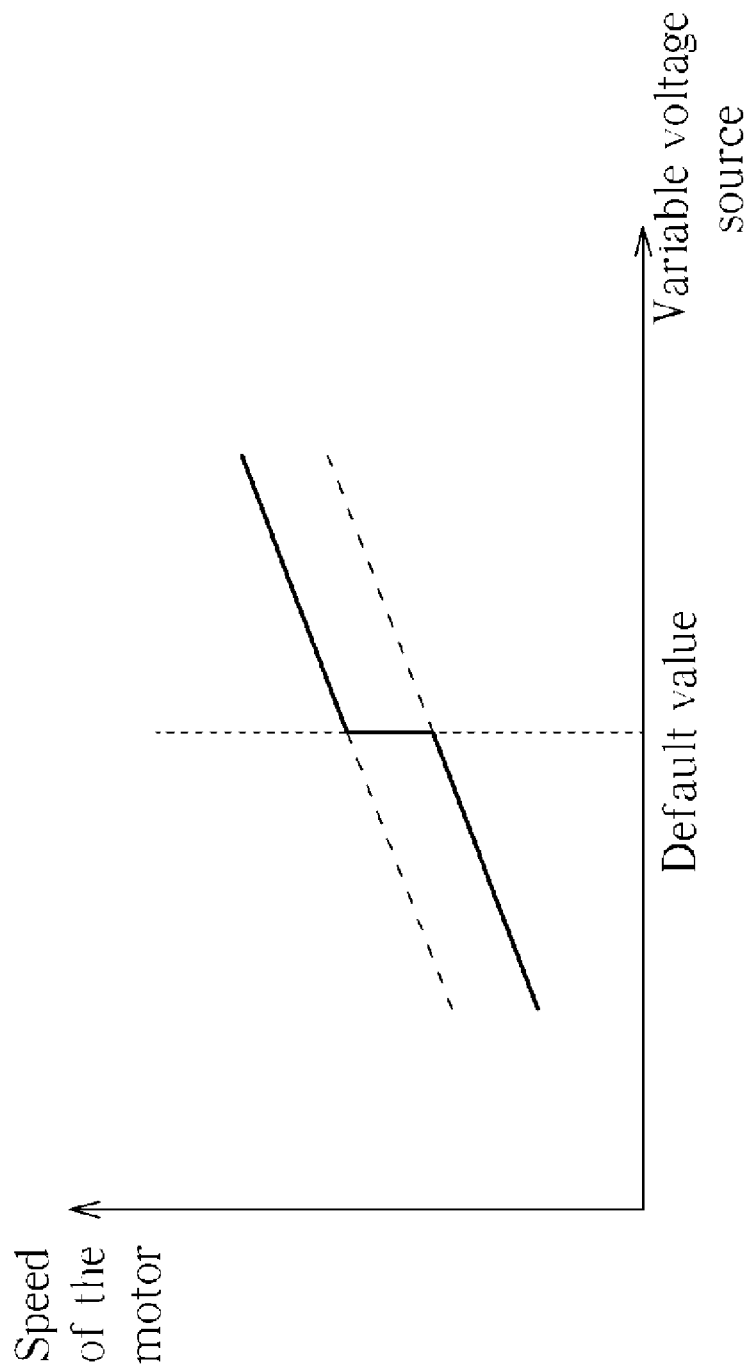
FIG. 4 is a schematic diagram of the speed of the motor relative to the variable voltage source according to an embodiment of the present invention.

Compared to the prior art, the present invention changes circuit routes by switching the first switching device 222 and the second switching device 224, thereby adjusting the voltage between the collector 200 and the base 204 of the motor-driving unit 20. The potential difference adjusted by the present invention is less affected by a load current and more ideally linear. Please refer to FIG. 3, which is a schematic diagram of the voltage between the collector 200 and the emitter 202 of the motor-driving unit 20 relative to the variable voltage source VIN according to an embodiment of the present invention. In FIG. 3, when magnitude of the variable voltage source VIN is more than the default value, the voltage between the collector 200 and the emitter 202 of the motor-driving unit 20 drops suddenly, and then increases linearly with increases of the variable voltage source VIN. When magnitude of the variable voltage source VIN is less than the default value, the voltage between the collector 200 and the emitter 202 of the motor-driving unit 20 rises suddenly, and then decreases linearly with decreases of the variable voltage source VIN. Thus, in the present invention, variations of the voltage between the collector 200 and the emitter 202 of the motor-driving unit 20 are ideally linear. Please refer to FIG. 4, which is a schematic diagram of the speed of the motor 28 relative to the variable voltage source VIN according to an embodiment of the present invention. Corresponding to FIG. 3, in FIG. 4, when magnitude of the variable voltage source VIN is more than the default value, the speed of the motor 28 rises suddenly, and then increases linearly with increases of the variable voltage source VIN. When magnitude of the variable voltage source VIN is less than the default value, the speed of the motor 28 drops suddenly, and then decreases linearly with decreases of the variable voltage source VIN. Thus, corresponding to voltage variations in FIG. 3, variations of the speed of the motor 28 shown in FIG. 4 are linear too.

Moreover, compared to the prior art, the present invention adjusts the output voltage $V_{OUT}$ without using a resistor, thereby avoiding considerable power consumption caused by the resistor. Furthermore, since current flowing through the voltage-dropping device 220 is a small current, more power consumption can be saved and power efficiency can be enhanced. The present invention also utilizes small-sized switching devices instead of big-sized power devices to save area occupied by the devices, thereby facilitating realization of the present invention with integrated circuits.

Please note that, in FIG. 2, the motor-driving unit 20 is an N-type bipolar junction transistor, but it can also be an N-MOS. Similarly, the voltage-dropping device 220 can be implemented by an N-MOS or a Zener diode. Furthermore, both the first switching device 222 and the second switching device 224 can be respectively implemented by a BJT, a MOS or a relay.

In conclusion, the potential difference adjusted by the motor driving circuit in the present invention is less affected by a load current and more ideally linear. Moreover, the present invention adjusts the output voltage without using a resistor, thereby avoiding considerable power consumption caused by the resistor. Since current flowing through the voltage-dropping device is a small current, more power consumption can be saved and power efficiency can be enhanced. Furthermore, the present invention utilizes small-sized switching devices instead of big-sized power devices to save area occupied by the devices, thereby facilitating realization of the present invention with integrated circuits.

Those skilled in the art will readily observe that numerous modifications and alterations of the device and method may be made while retaining the teachings of the invention.

What is claimed is:

1. A motor driving circuit for adjusting speed of a motor by changing an output voltage, one end of the motor being coupled to a variable voltage source, the motor driving circuit comprising:

a motor-driving unit for driving the motor, comprising a first end coupled to another end of the motor, a second end coupled to a ground and a third end;

a control unit coupled between the first end and the third end of the motor-driving unit for controlling the voltage between the first end and the third end of the motor-driving unit; and a determining unit coupled between the variable voltage source and the control unit for controlling the control unit to adjust the voltage between the first end and the third end of the motor-driving unit according to a magnitude of the voltage of the variable voltage source;

wherein the control unit comprises:

a first switching device coupled between the first end of the motor-driving unit and a first end of a voltage-dropping device; and a second switching device coupled to the first end of the voltage-dropping device.

2. The motor driving circuit of claim 1, wherein the control unit comprises:
the voltage-dropping device for conducting the motor-driving unit and providing a dropping voltage when conducting, comprising the first end and a second end, the second end being coupled to the third end of the motor-driving unit;
wherein the determining unit switches the first switching device and the second switching device according to magnitude of the voltage of the variable voltage source, for controlling the control unit to adjust the voltage between the first end and the third end of the motor-driving unit.

3. The motor driving circuit of claim 2, wherein the determining unit turns on the second switching device and turns off the first switching device when magnitude of the voltage of the variable voltage source is more than a default value.

4. The motor driving circuit of claim 2, wherein the determining unit turns off the second switching device and turns on the first switching device when magnitude of the voltage of the variable voltage source is less than a default value.

5. The motor driving circuit of claim 2, wherein the motor-driving unit is an N-type bipolar junction transistor, the first end of the motor-driving unit is the collector, the second end is the emitter and the third end is the base.

6. The motor driving circuit of claim 2, wherein the motor-driving unit is an N-MOS, the first end of the motor-driving unit is the drain, the second end is the source and the third end is the gate.

7. The motor driving circuit of claim 2, wherein the voltage-dropping device is an N-type bipolar junction transistor, an N-MOS or a Zener diode.

8. The motor driving circuit of claim 2, wherein the first switching device is a bipolar junction transistor, a MOS or a relay.

9. The motor driving circuit of claim 2, wherein the second switching device is a bipolar junction transistor, a MOS or a relay.

* * * * *